(No Model.)
A. J. FALES.
LEMON SQUEEZER.
No. 577,291. Patented Feb. 16, 1897.
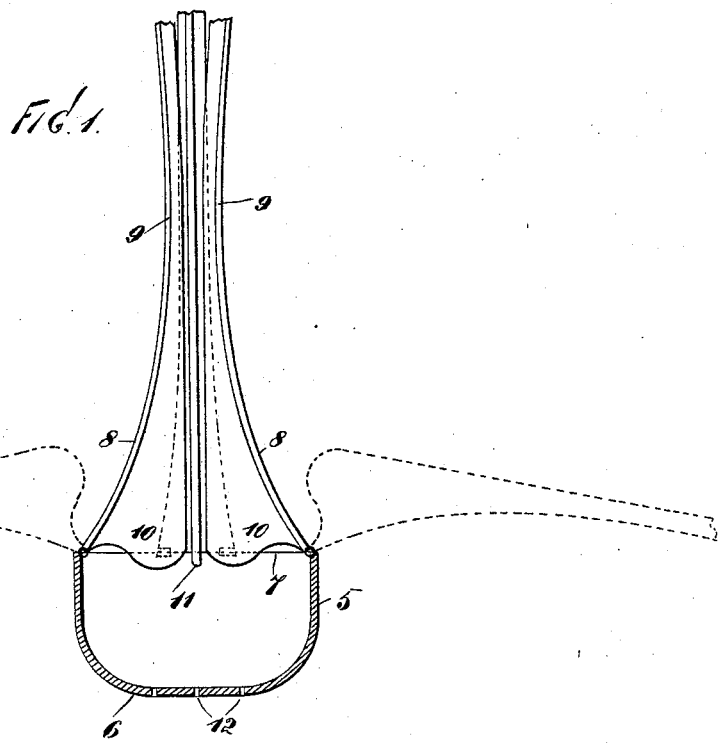
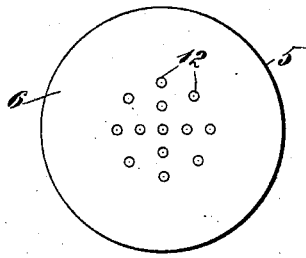
WITNESSES
INVENTOR
BY
ATTORNEYS.

UNITED STATES PATENT OFFICE.

ANNIE JAMES FALES, OF MOREHEAD CITY, NORTH CAROLINA.

LEMON-SQUEEZER.

SPECIFICATION forming part of Letters Patent No. 577,291, dated February 16, 1897.

Application filed August 10, 1896. Serial No. 602,297. (No model.)

*To all whom it may concern:*

Be it known that I, ANNIE JAMES FALES, a citizen of the United States, and a resident of Morehead City, in the county of Carteret and State of North Carolina, have invented certain new and useful Improvements in Lemon-Juice Extractors, of which the following is a specification, reference being had to the accompanying drawings, forming a part thereof, in which similar numerals of reference indicate corresponding parts wherever found throughout both views.

This invention relates to devices for extracting the juice from lemons, and the object thereof is to provide an improved device of this class which is simple in construction and operation and comparatively inexpensive.

The invention is fully disclosed in the following specification, of which the accompanying drawings form a part, in which—

Figure 1 is a central vertical section of my improved lemon-juice extractor, and Fig. 2 a bottom plan view thereof.

In the practice of my invention I provide a cup-shaped receptacle 5, having a perforated bottom 6, and which is open at the top, as shown at 7, and hinged to the opposite sides thereof are triangular plates or jaws 8, four of which are preferably employed, and said plates or jaws are provided with upwardly-directed arms or handles 9, and the bottom portions thereof are downwardly curved, as shown at 10.

The plates or jaws may be of any desired form, and are designed to serve as means for compressing a lemon, so as to extract or force the juice therefrom, and they may be provided centrally thereof with inwardly-directed flanges 11, designed for cutting or breaking the pulp and rind of the lemon.

The operation will be readily understood from the foregoing description when taken in connection with the accompanying drawings and the following statement thereof.

The end of a lemon is first preferably cut off and the lemon is inserted between the lower ends of the jaws or plates 8, and the handles 9 thereof are then brought together, as shown in Fig. 1, considerable pressure being applied for this purpose, and by this operation the lemon is squeezed or contracted between the plates or jaws 8, by which means the juice is extracted therefrom and flows or drops down into the bottom of the receptacle 5 and out through the perforations 12 in the bottom thereof into any suitable receptacle prepared therefor.

The invardly-curved portions 10 of the plates or jaws and the flanges 11 assist in compressing the lemon and forcing the juice therefrom, and this device may be made of any desired material, but in practice I prefer to select material which will not corrode or be affected by fluids or acids.

The receptacle 5 may be square in cross-section, if desired, and my invention is not limited to the size or the depth thereof nor to the form of the plates 8, which are hinged thereto.

This device is simple in construction and operation, and I thus provide a device for extracting the juice from a lemon or lemons without extracting the oil from the rind thereof, said device being also comparatively inexpensive and being adapted to be used in connection with any suitable receptacle for the extracted juice.

Having fully described my invention, I claim as new and desire to secure by Letters Patent—

The herein-described lemon-juice extractor, which consists of a suitable receptacle provided with a perforated bottom, and open at the top, and plates or jaws hinged to the opposite sides thereof, and provided with upwardly-directed arms or handles, said plates being also provided on their inner sides with inwardly-directed projections, and vertical flanges, substantially as shown and described.

In testimony that I claim the foregoing as my invention I have signed my name, in presence of the subscribing witnesses, this 3d day of August, 1896.

ANNIE JAMES FALES.

Witnesses:
LILLIE F. FALES,
J. B. ARENDELL.